United States Patent [19]
Miki et al.

[11] Patent Number: 5,426,813
[45] Date of Patent: Jun. 27, 1995

[54] WIPER FOR OUTSIDE MIRROR INCLUDING A STRING FOR WIPING

[75] Inventors: Tsuyoshi Miki, Fujioka; Junichi Shoji; Masayuki Yokota, both of Isehara; George Kato, Tokyo; Yuji Sho, Isehara, all of Japan

[73] Assignee: Ichikoh Industries, Ltd., Tokyo, Japan

[21] Appl. No.: 157,255

[22] Filed: Nov. 26, 1993

[30] Foreign Application Priority Data

Nov. 27, 1992 [JP]  Japan ............... 4-082047 U

[51] Int. Cl.⁶ ................. B60S 1/56; B60S 1/38; B60S 1/44
[52] U.S. Cl. ................. 15/250.003; 15/250.36; 15/250.30; 15/250.24; 15/250.38; 15/250.39
[58] Field of Search ......... 15/250.003, 250.002, 15/250.001, 250.24, 250.36, 250.38, 250.39, 250.22, 250.15, 250.30, 250.31

[56] References Cited

U.S. PATENT DOCUMENTS

| 3,086,239 | 4/1963 | Peras | 15/250.36 |
| 3,902,218 | 9/1990 | Bryant | 15/250 |
| 4,945,600 | 8/1990 | Gastmann | 15/250.24 |

FOREIGN PATENT DOCUMENTS

| 2148050 | 3/1973 | Germany | 15/250.002 |
| 2148756 | 4/1973 | Germany | 15/250.002 |
| 2420675 | 7/1975 | Germany | 15/250.002 |
| 57-174260 | 4/1981 | Japan . | |

Primary Examiner—Gary K. Graham
Attorney, Agent, or Firm—Foley & Lardner

[57] ABSTRACT

A wiper for an outside mirror including a mirror housing supporting tiltably a mirror holder to which a mirror proper is fixed, comprising an endless circumferentially moving belt so disposed generally along the circumference of the mirror proper as not to overlie the reflecting surface of the mirror proper, a plurality of pulleys so disposed as to have the circumferentially moving belt threaded thereon, and a string disposed along the reflecting surface of the mirror proper and which is connected at one end thereof to the circumferentially moving belt and at the other end to a tensioner which imparts a tension to the spring. When one of the pulleys is rotated, the circumferentially moving belt is rotated, the tensed string slides in contact with the mirror surface to wipe the latter.

13 Claims, 16 Drawing Sheets

WIPER FOR OUTSIDE MIRROR INCLUDING A STRING FOR WIPING

BACKGROUND OF THE INVENTION a) Field of the Invention

The present invention relates to a wiper destined for use in an outside mirror device of a vehicle to wipe the mirror surface thereof.

b) Prior Art Statement

Some of the recent outside mirrors for vehicles are provided with a wiper to wipe away raindrops or dust from the mirror surface.

FIG. 1 is a front view of a typical one of such conventional mirror wipers. As seen, the mirror device is composed of a mirror holder 100, a mirror proper 102 fixed to the mirror holder 100 and a mirror housing 104 supporting the mirror holder 100. The mirror housing 104 is supported by a mirror base 108 fixed on a car body. The mirror wiper has a wiper arm 110 installed on a wiper arm shaft 112 which is provided through the mirror housing 104. When the wiper arm shaft 112 is reciprocally turned, the wiper arm 110 carrying a wiper blade 101 is reciprocally deflected and thus the wiper blade 101 wipes the reflecting surface of the mirror proper 102.

As shown in FIG. 1, the conventional mirror wiper spoils the appearance of the mirror device and also limits the effective reflecting area of the mirror surface because the wiper arm 110 and wiper blade 101 remain on the mirror surface even while the wiper is out of wiping operation.

Assume now that a penthouse-like wiper receptacle 106 (indicated with an imaginary line in FIG. 1) is provided at the upper portion of the mirror housing 104. The wiper blade 101 can be concealed as placed under the wiper receptacle 106, but the wire arm 110 cannot. Further, the wiper arm 110 and wiper blade 101 have a relatively large inertia. The drive to reciprocally move these members has to be of a high precision. If the precision is not high (there is a backlash between the members), they will generate a noise.

SUMMARY OF THE INVENTION

The present invention has an object to overcome the above-mentioned drawbacks of the prior-art mirror wipers by providing a wiper for an outside mirror device, of which the components scarcely appear on the mirror surface while the wiper is out of operation, and which will not possibly generate any noise and can also be used in a remote-controlled mirror device.

The above object is accomplished by providing an outside-mirror wiper comprising, according to the present invention, an endless circumferentially moving belt disposed generally along the circumference of the mirror proper so as not to overlie the reflecting surface of the mirror proper, that is, in such a manner that the reflecting surface of the mirror proper is nearly fully visible from the vehicle driver, a plurality of pulleys so disposed as to have the circumferentially moving belt threaded thereon, and a string disposed along the reflecting surface of the mirror proper and which is connected at one end thereof to the circumferentially moving belt and at the other end to, a tensioner which imparts a tension to the spring. When the circumferentially moving belt is rotated, the string connected at the one thereof to the circumferentially moving belt wipes the reflecting surface while sliding in contact with the mirror surface. The plurality of pulleys impart a rotation to the endless circumferentially moving belt. As the circumferentially moving belt rotates, the string connected at the one end thereof to the belt moves along the reflecting surface of the mirror proper. Since the string is tensed by the tensioner, it slides in contact with the reflecting surface to wipe the latter.

DETAILED DESCRIPTION OF THE PREFERRED EMBODIMENTS

Figure 1:
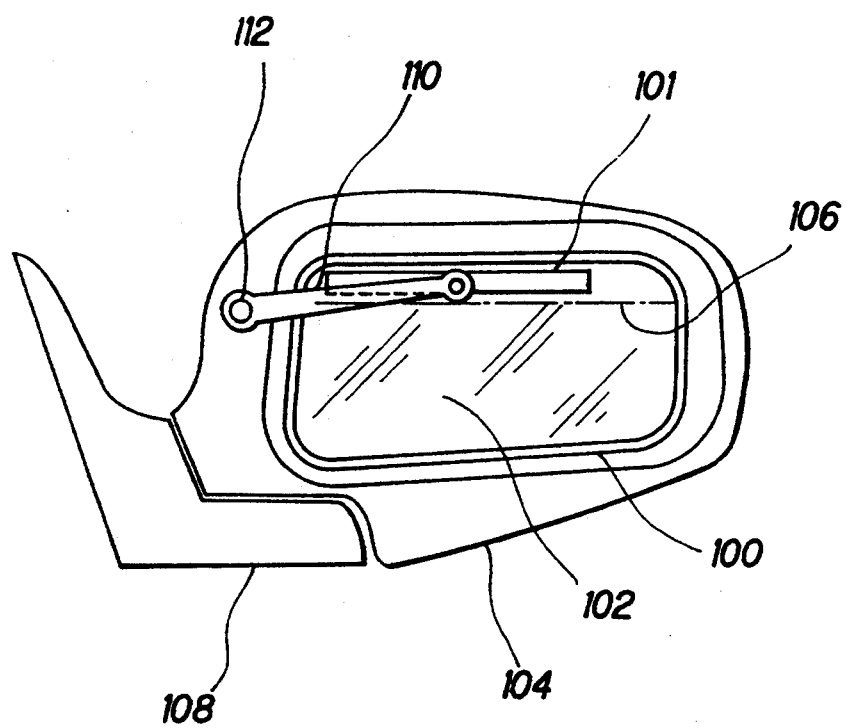
FIG. 1 is a schematic front view of an outside mirror device equipped with a conventional mirror wiper.
Figure 2:
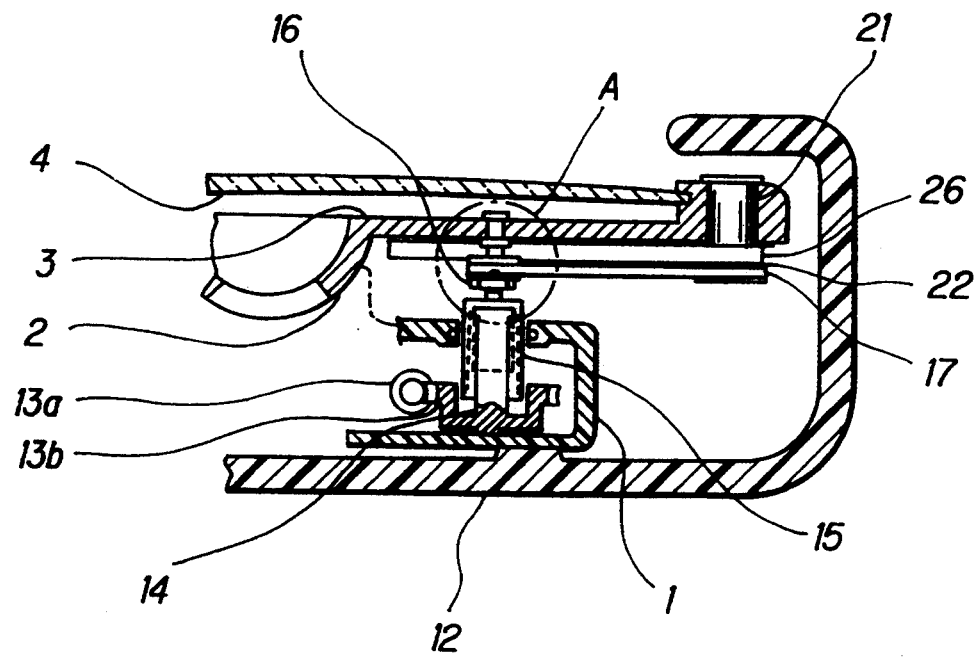
FIG. 2 is a sectional view, enlarged in scale, of the essential portion of the drive mechanism of a first embodiment of the mirror wiper according to the present invention.
Figure 3:
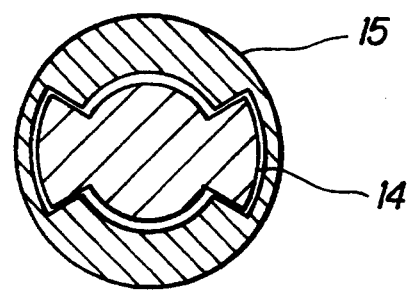
FIG. 3 is a sectional view, enlarged in scale, of the transmission and drive shafts in FIG. 2.

FIG. 2 is a sectional view of the first embodiment of the mirror wiper according to the present invention. The portion A in FIG. 2 is shown as enlarged in scale in FIG. 3. The reference numeral 12 denotes a mirror housing which supports tiltably a mirror holder 3 by means of a ball joint 2 and fixedly a drive housing 1 of a motor-driven remote-controlled mirror device. The reference numeral 4 denotes a mirror proper secured to the mirror holder 3. A pulley shaft 21 is pivotably supported in the mirror holder 3 and supports a pulley 22. The pulley 22 have wound thereon a transmission belt 17 and a circumferentially moving belt 26 which will be described in further detail below with reference to FIG. 4. The reference numeral 14 denotes a drive shaft.

Figure 4:
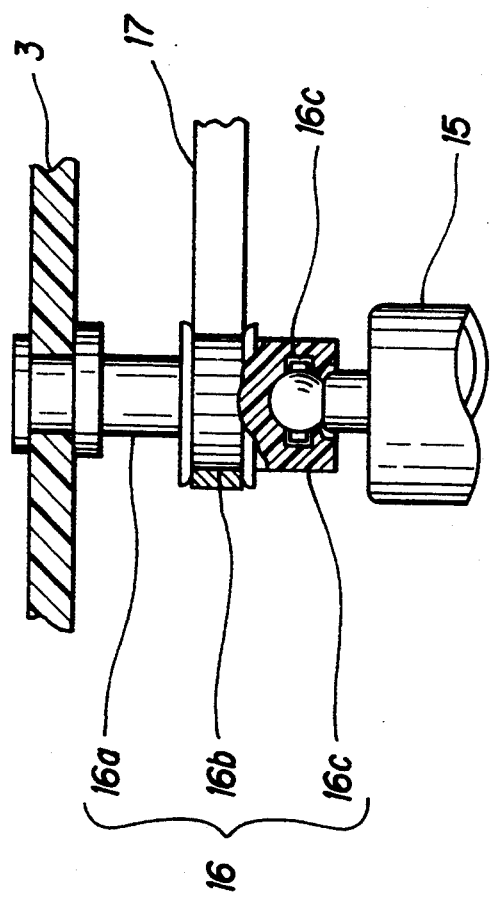
FIG. 4 is a partially fragmentary sectional view, enlarged in scale, of the pulley with universal joint in FIG. 2.

As shown in FIG. 4, the mirror holder 3 has installed thereto a pulley 16 provided with a universal joint 16c. The transmission belt 17 is put on the pulley 16 and transmission pulley 17 to transmit a rotation to the latter. The pulley 16 is integrally formed by a pivot 16a rotatably provided in the mirror holder 3, a pulley 16b and the universal joint 16c all disposed concentrically with respect to each other. The universal joint 16c has a transmission shaft 15 connected thereto and is locked by a detent 16c₁ against relative rotation. Rotation of this transmission shaft 15 is transmitted by means of the universal joint 16c to the pulley 16b and transmission belt 17 which will thus be rotated (see FIG. 2). The drive shaft 14 is fitted in the transmission shaft 15 (shown as the portion A in FIG. 2) as shown in detail in the sectional view in FIG. 3. When the transmission belt 17 is rotated, the pulley 22 rotates to rotate the circumferentially moving belt 26 which will further discussed below.

Figure 5:
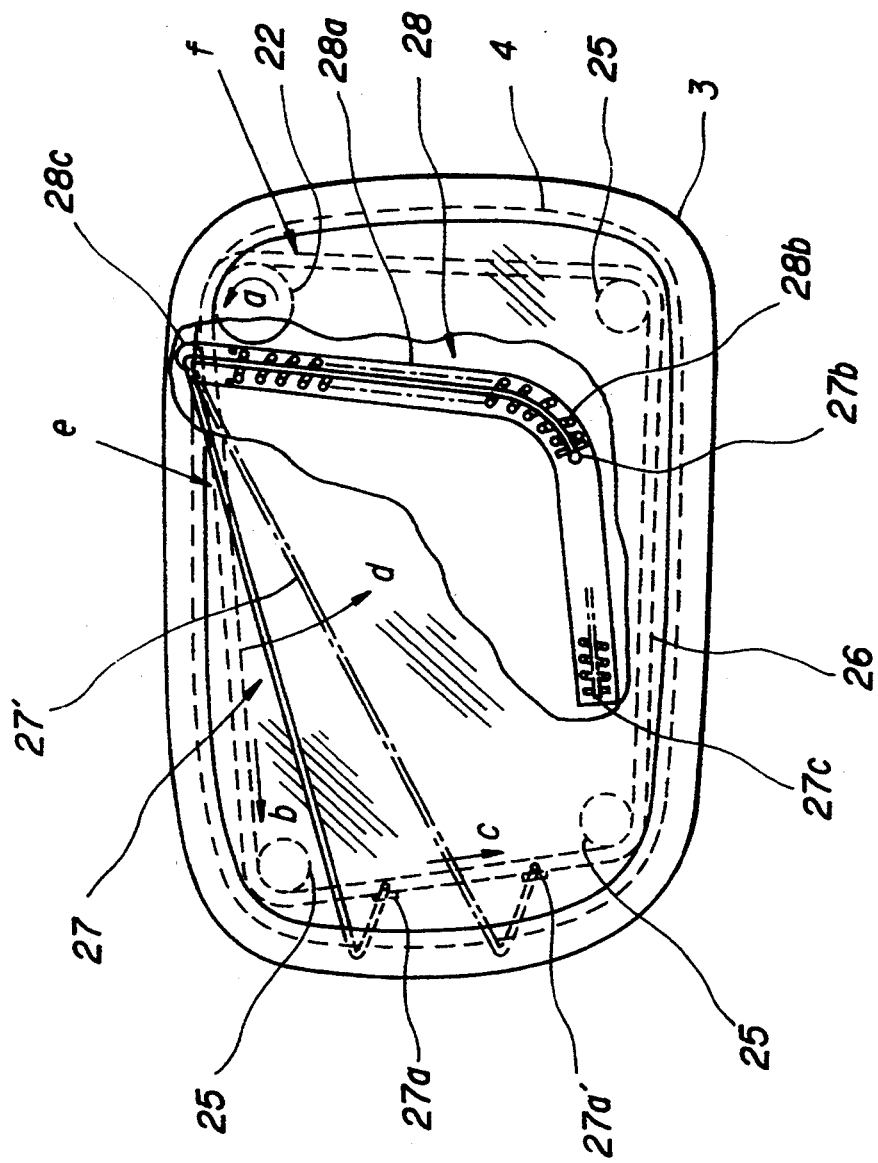
FIG. 5 is a partially fragmentary front view showing the first embodiment of the mirror wiper of the present invention.

FIG. 5 is a front view showing the mirror holder 3 used in this embodiment and members provided on the mirror holder 3. The mirror holder 3 has the mirror proper 4 fixed thereon. As shown in FIG. 5, the circumferential edge of the mirror proper 4 is covered with the mirror holder 3 and it is indicated with an imaginary line. The pulley 22 and three idler pulleys 25 are disposed each at the four corners of, and behind, the mirror proper 4. The endless circumferentially moving belt 26 is threaded on these pulleys 22 and 25. Thus, these pulleys 22 and 25 as well as the circumferentially moving belt 26 will not overlie the reflecting suffice of the mirror proper 4. It is essential that such members do not overlie the reflecting surface of the mirror proper 4. However, they may be otherwise so disposed. For example, they may be disposed by the sides of the mirror proper 4 unless they will overlie the reflecting surface of the mirror proper 4.

Figure 6:
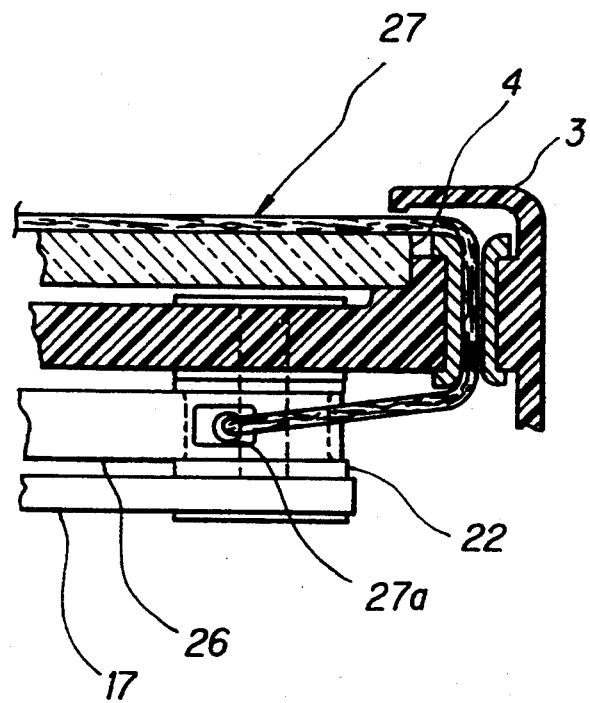
FIG. 6 is a schematic fragmentary sectional view showing the connection between one end of the string and circumferentially morning belt in FIG. 5.

A string 27 is extended across, and in close contact with, the surface of the mirror proper 4. It is led at one end 27a thereof over the edge (indicated with an imaginary line) of the mirror proper 4 to behind the mirror proper 4 and connected to the circumferentially moving belt 26. In this embodiment, a synthetic resin-made twist yarn of 0.7 to 1.0 mm in diameter is used as the string 27; however, the string 27 is not limited to such twist yarn but the string 27 may be a material such as synthetic resin-made fishing gut or braid of 0.7 to 1.0 mm in diameter which will be capable of wiping the reflecting surface of the mirror proper 4 when it is tensed with an appropriate tension. FIG. 6 is a schematic sectional view, enlarged in scale, of the essential portion, showing the connection of the string 27 at the one end 27a thereof to the circumferentially moving belt 26. As the circumferentially moving belt 26 is rotated over the aforementioned pulleys 22 and 25, the one end 27a of the string 27 is moved as guided by the circumferentially moving belt 26. More particularly, the pulley 22 is rotated in the direction of arrow a as shown in FIG. 5 as driven by the transmission belt 17 as having previously been described with reference to FIG. 2. While being rotated by the transmission belt 17, the pulley 22 rotates the circumferentially moving belt 26. When the circumferentially moving belt 26 is rotated in the directions of arrows b and c, the one end 27a of the string 27 is moved in the direction of arrow b and reaches a position 27a′. Along with these motions, the string 27 is moved in the direction of circular arrow d from a position indicated with a solid line to a one 27′ indicated with a dot-dash line.

Figure 7:
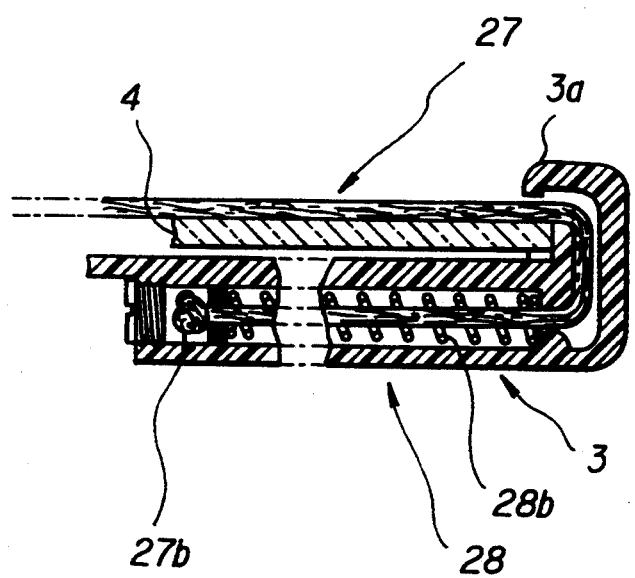
FIG. 7 is also a schematic fragmentary sectional view showing the connection between the other end of the string and tensioner in FIG. 5.

As easily seen from FIG. 5, the straight portion of the string 27′ (indicated with the dot-dash line) is longer than that of the string 27 (indicated with the solid line). Namely, the straight portion of the string 27 varies in length depending upon where the one end 27 a of the string 27 is. Therefore, a tensioner 28 is provided to impart a predetermined tension to the string 27 in order to prevent the string 27 from being loosened or broken. The tensioner 28 is so constructed as to draw in the other end 27b of the string 27 through an elongated channel or tube 28a. The reference numeral 28b denotes a tension coil spring which gives a tension to pull in the string 27 through the tube 28a. Led into or out of the tube 28a through a tensioner inlet 28c to maintain a nearly constant tension, the string 27 wipes the surface of the mirror proper 4 while sliding thereon. FIG. 7 is a schematic fragmentary sectional view of the central portion of the tensioner 28.

The pulley 22 shown in FIG. 5 rotates in the direction of circular arrow a. Along with this rotation, the circumferentially moving belt 26 rotates in the direction of arrows b and c. Thus, the one end 27a of the string 27, that is, the fixation of the one end 27a to the circumferentially moving belt 26, reaches a position e shown in FIG. 5. In this condition, the string 27 is not visible from outside because it is concealed inside a penthouse 3a (see FIG. 7) of the mirror holder 3. Also, the majority of the string 27 is pulled in the tensioner 28 and the one end 27a of the string 27 arrives at a stroke end 27c (indicated with an imaginary line).

When the one end 27a of the string 27 is moved in the directions of arrows b and c to a position f as the circumferentially moving belt 26 is rotated, the string 27 will have wiped almost the entire surface (whole area visible from outside) of the mirror proper 4.

According to the first embodiment in FIG. 2, the rotation of the universal joint 16c is transmitted to the pulley shaft 21 via the belt 17 and pulley 22. However, this transmission mechanism may be composed of a gear train. Also, a connecting rod of a crank mechanism may be used for such a transmission of rotation, which permits to obtain a same effect as in this embodiment (FIGS. 2 and 4).

The circumferentially moving belt 26 may be rotated either continuously or reciprocally. However, if the belt 26 is rotated continuously, the string 27 will be twisted. To avoid such twisting, an untwisting means must be provided as will be described later with reference to FIGS. 6 and 7.

The embodiment shown in FIG. 2 is applied to a motor-driven remote-controlled type outside mirror device. There is provided inside the drive housing 1 the drive shaft 14 axially slidable but not rotatable in relation to the transmission shaft 15. The reference numeral 13a denotes a driving worm gear and 13b denotes a driven worm gear. The driving worm gear 13a is disposed in mesh with the driven worm gear 13b. The driven worm gear 13b is formed integrally with the drive shaft 14. The driving worm gear 13a is reciprocally rotated by a wiper driving motor (not shown) disposed inside the drive housing 1. The aforementioned motor-driven remote-controlled mirror device is such that a mirror holder to which a mirror proper is fixed is supported tiltably to a mirror housing and the mirror holder can be tilted vertically and horizontally by motors disposed inside the mirror housing and remote-controllable from the driver seat.

Figure 8:
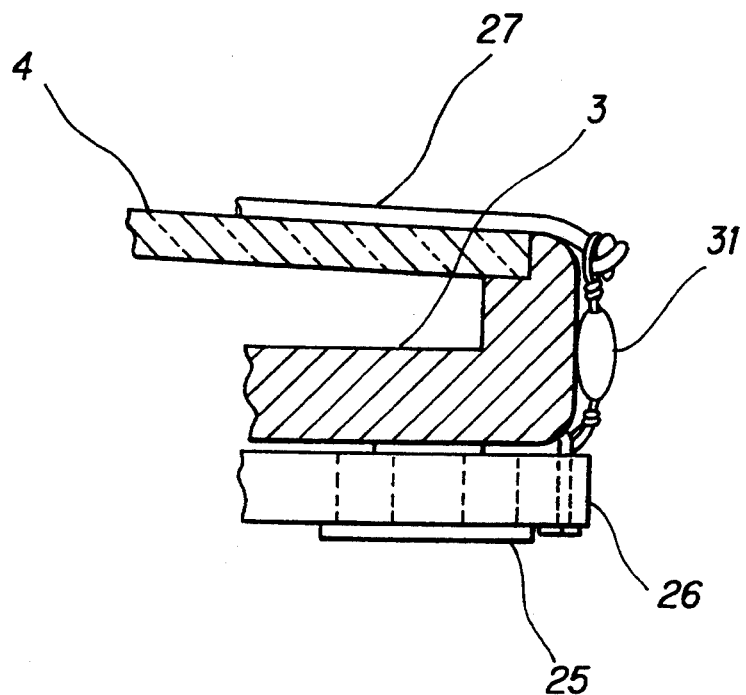
FIG. 8 is a partial side elevation of a variant of the first embodiment shown in FIG. 5.
Figure 9:
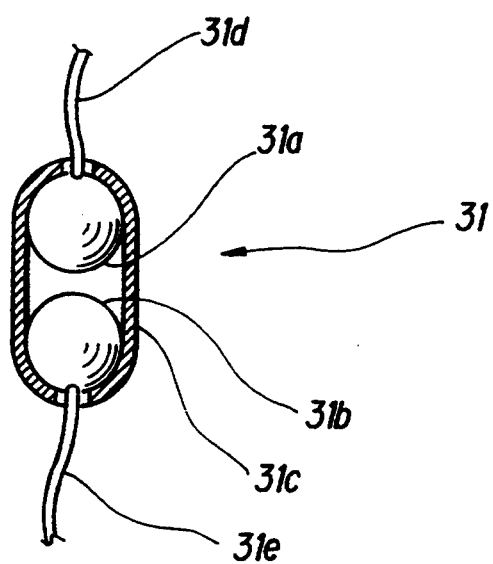
FIG. 9 is an axial sectional view, enlarged in scale, of the untwisting joint in FIG. 8.

According to the embodiment shown in FIG. 5, when the circumferentially moving belt 26 is rotated reciprocally in the directions of arrows b and c and in the opposite directions of arrows c and b, the string 27 wipes the reflection surface of the mirror proper 4. However, if the circumferentially moving belt 26 is rotated only in a certain direction, the string 27 is twisted. Variants to avoid such twisting will sequentially be described below with reference to FIGS. 8 to 11. FIG. 8 is a sectional view of the idler pulley 25 in once of such variants. As seen in FIG. 8, an untwisting joint 31 is interposed between the string 27 and circumferentially moving belt 26. The enlarged detail of this untwisting joint is shown in FIG. 9. The untwisting joint 31 includes two balls 31a and 31b housed in a case 31c and to which joint strings 31d and 31e are connected respectively. The joint strings 31d and 31e in pair are freely rotatable independently of each other. Thus, the untwisting joint 31 restrains the string 27 from being twisted in relation to the circumferentially moving belt 26.

Figure 10:
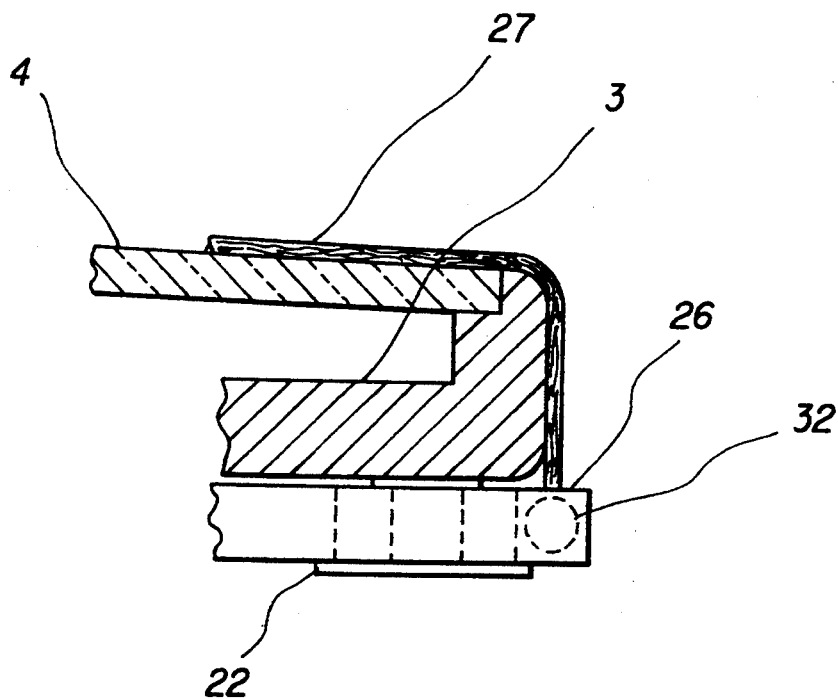
FIG. 10 is a partial side elevation of another variant of the first embodiment in FIG. 8.
Figure 11A:
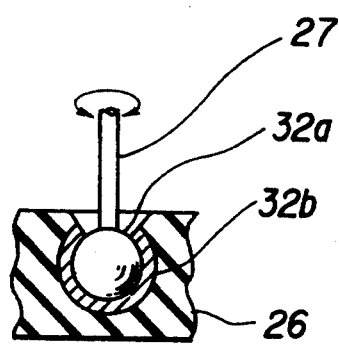
FIGS. 11(A) and 11(B) are explanatory drawings of the connection between one end of the string and circumferentially moving belt.
Figure 11B:
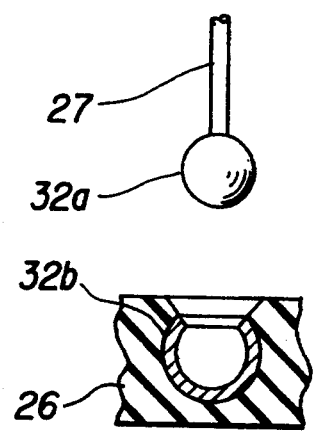

FIG. 10 is an explanatory drawing of a string untwisting mechanism different in construction from the above-mentioned one. In this variant, the string 27 is connected at one end thereof to the circumferentially moving belt 26 by means of a ball joint 32. FIGS. 11(A) is s sectional view of the ball joint 32 and FIG. 11(B) is an exploded sectional view thereof. The ball joint 32 consists of a ball 32a to which one end of the string 27 is connected and a concave spheric seat 32b fixed as buffed in the circumferentially moving belt 26 and in which the ball 32a is rotataby fitted. In the variant shown in FIG. 10, the ball joint 32 is buffed in the circumferentially moving belt 26, so that the mirror holder 3 can be designed thinner than that in the variant shown in FIG. 8.

As evident to those skilled in the art from the above total description made with reference to FIGS. 8 to 11, the connection between the string 27 and circumferentially moving belt 26 by means of a "relatively rotatable joint member" permits to prevent the string 27 from being twisted even when the circumferentially moving belt 26 is rotated continuously (not reciprocally).

Figure 12:
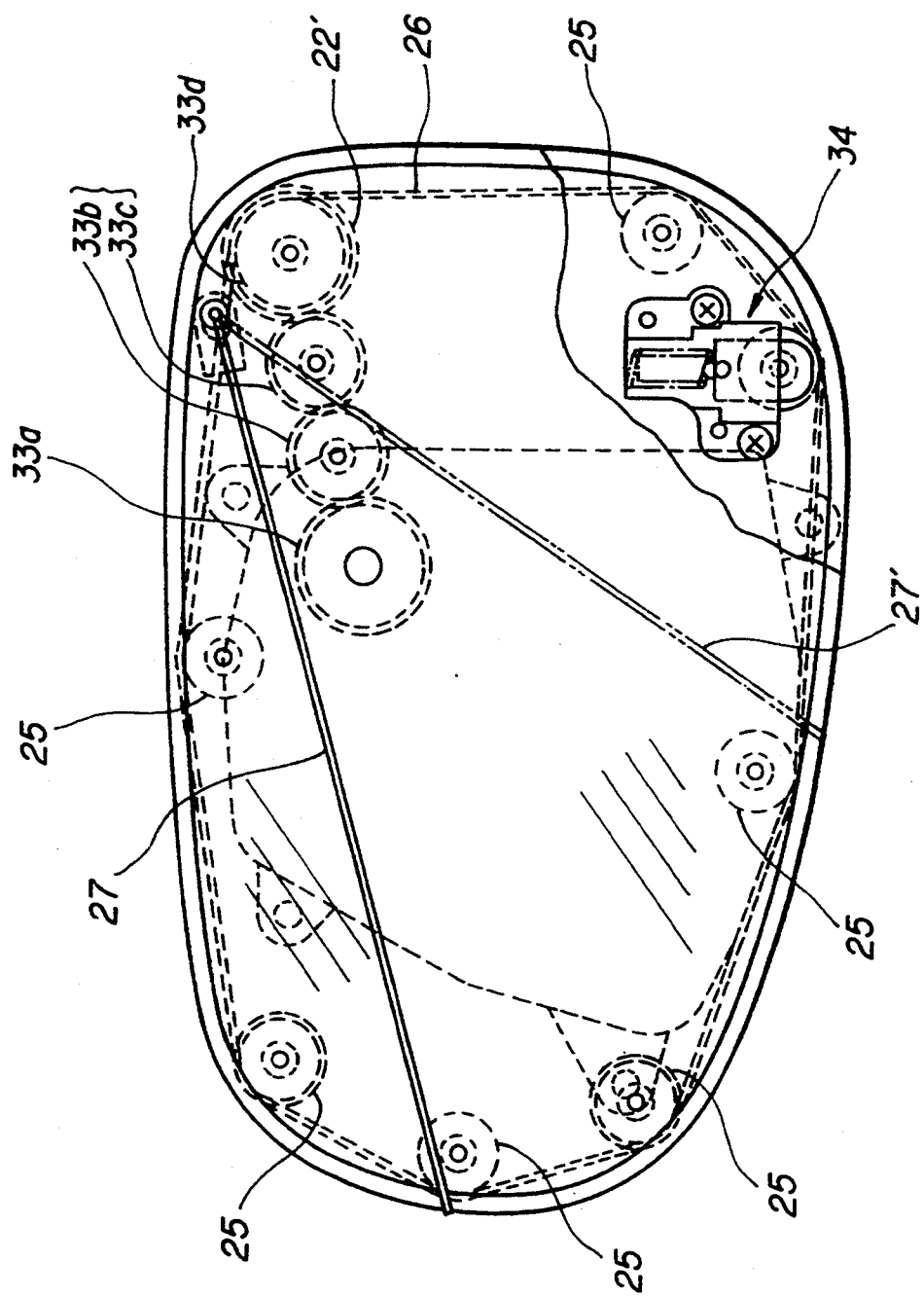
FIG. 12 is a partially fragmentary front view schematically showing a second embodiment of the mirror wiper according to the present invention.
Figure 13:
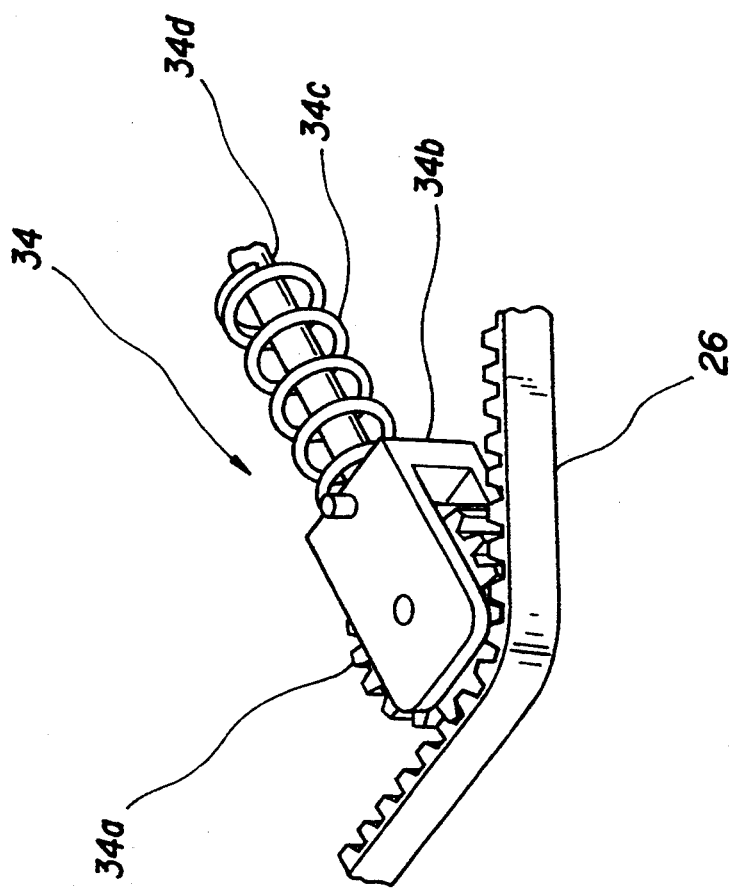
FIG. 13 is a schematic perspective view of the essential portion of the second embodiment in FIG. 12.

FIGS. 12 and 13 show the second embodiment of the mirror wiper according to the present invention. FIG. 12 is a front view corresponding to FIG. 5 which shows the first embodiment. The differences of this second embodiment (FIG. 12) from the first one in FIG. 5 are as follows.

(1) A plurality (six) of idler pulleys 25 are provided.

(2) The rotatable drive pulley 22' on which the circumferentially moving belt 26 is threaded has fixed thereto a driven gear 33d which a drive gear 33a rotates by means of intermediate gears 33b and 33c.

(3) A belt tensioner 34 is disposed in the aforementioned place where the circumferentially moving belt 26 is wound.

FIG. 13 is a schematic perspective view of the above-mentioned belt tensioner 34. The reference numeral 34a denotes an idler pulley which is rotatably supported in a forked pulley holder 34b. The pulley holder 34b is connected to a guide bar 34d which guides the pulley holder 34b in a direction toward and away from the circumferentially moving belt 26. Also the pulley holder 34b is forced to the circumferentially moving belt 26 by means of a coil spring 34c. However, to force the pulley holder 34b to the circumferentially moving belt 26, any other elastic member than the coil spring may be used which would have a same effect as the coil spring.

The above arrangement of the belt tensioner 34 has the following advantages:

(1) The belt tensioner 34 can be moved backward with a slight force. So at the time of assembling, the circumferentially moving belt 26 can easily be put and engaged in place on the plurality of idler pulleys 25 and drive pulley 22' (as shown in FIG. 12). Even if the idler pulleys 25 are not precisely located in place or if the circumferentially moving belt 26 is not precisely dimensioned (or if the circumferentially moving belt 26 is elongated as the result of a long-time use of the mirror wiper), the circumferentially moving belt 26 can keep a constant tension.

(2) Even if any foreign matter is caught between the circumferentially moving belt 26 and pulleys, the belt tensioner 34 effectively works to prevent the circumferentially moving belt 26 from being excessively tensed. Thus the members associated with the circumferentially moving belt 26 will not possible be damaged.

Figure 14:
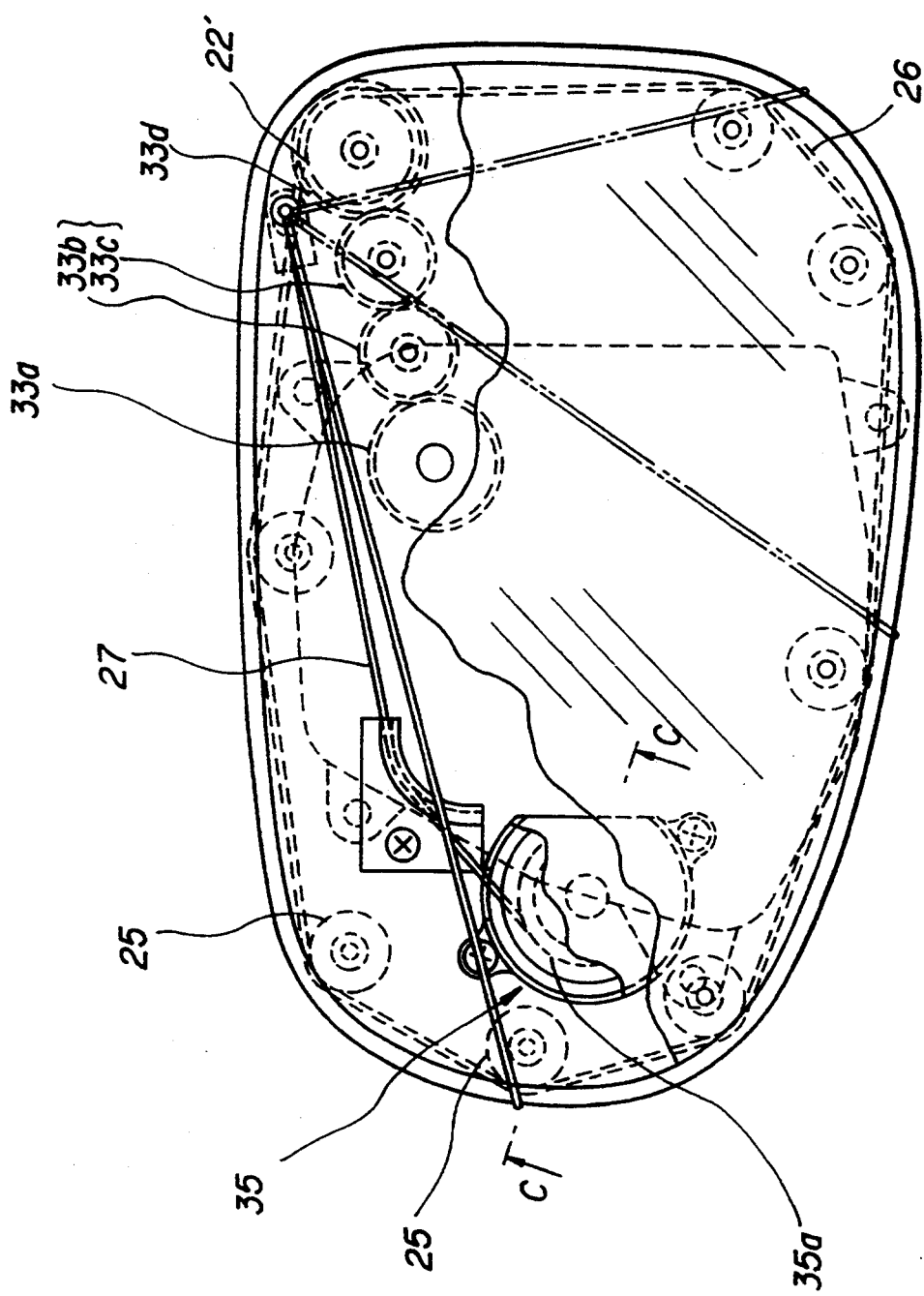
FIG. 14 is a partially fragmentary front view schematically showing a third embodiment of the mirror wiper according to the present invention.
Figure 15:
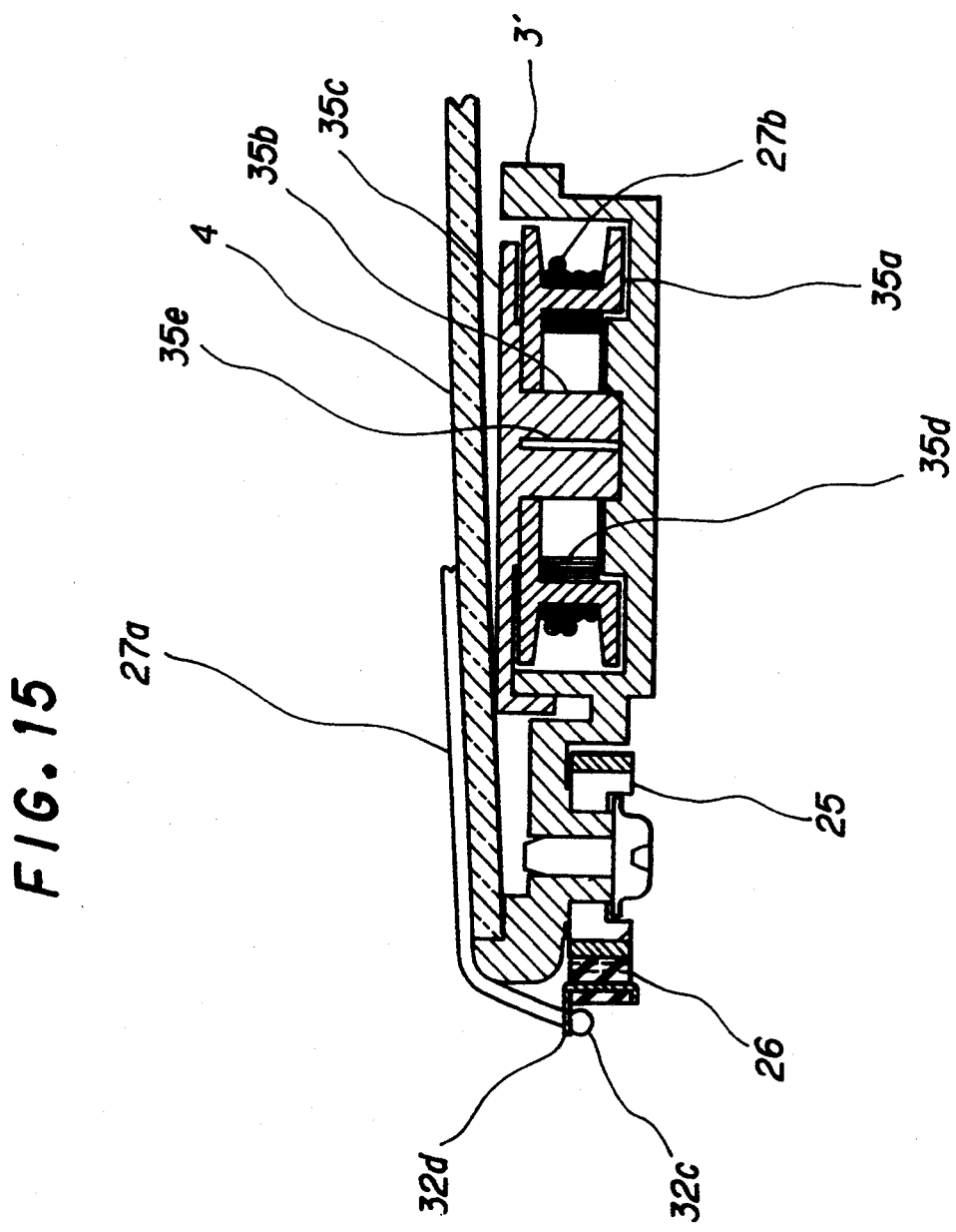
FIG. 15 is a sectional view, enlarged in scale, taken along the line C-C in FIG. 14.
Figure 16:
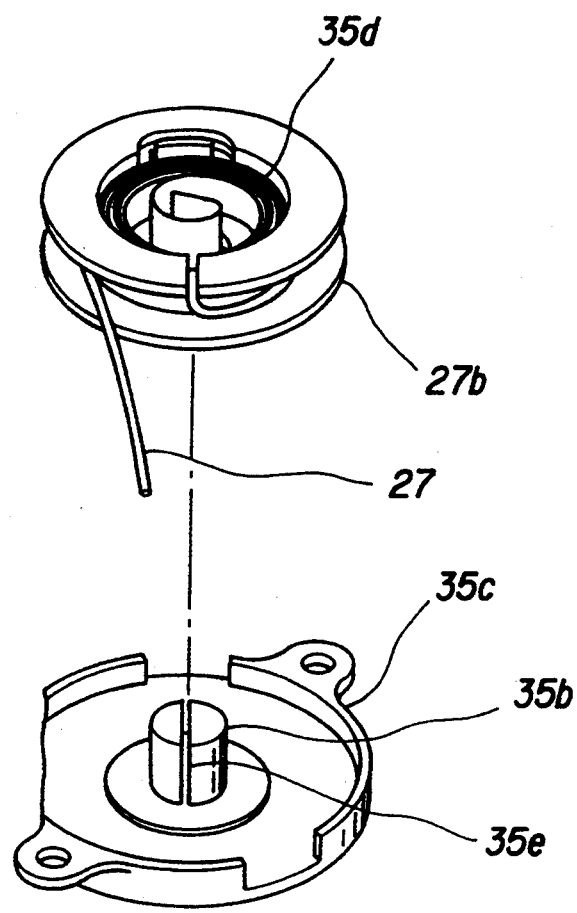
FIG. 16 is an exploded perspective view of the essential portion of the third embodiment in FIG. 14.

FIGS. 14 to 16 show the third embodiment of the mirror wiper according to the present invention.

FIG. 14 is a front view corresponding to FIG. 5 which shows the first embodiment. In the first embodiment shown in FIG. 5, the tension coil spring 28b is used for tensing the string 27. However, the third embodiment in FIG. 14 employs a string tensioner 35 provided with a drum 35a for winding the string 27. FIG. 15 is a sectional view taken along the line C—C in FIG. 14 showing the string tensioner 35, and FIG. 16 is an exploded perspective view of the string tensioner 35.

The string take-up drum 35a is rotatably supported on a drum shaft 35b. the drum shaft 35b is formed integrally with a drum cover 35c and fixed to the mirror holder 3'. A flat spiral spring 35d is provided between the drum shaft 35b and string take-up drum 35a to impart a rotation to the string take-up drum 35a. The reference numeral 35e denotes a cut formed in the drum shaft 35b and in which the inner end of the flat spiral spring 35d is to be put. The flat spiral spring 35d is a well-known leaf spring widely used in windup clocks and the like having a clockwork. The inner end of the spring is fixed to the drum shaft 35b while the outer end thereof is fixed to the inner wall of the drum 35a. The spring 35d works to absorb an external force of rotation if applied to the drum 35a. When such an external force disappears or is attenuated, the spring 35d will provide a force of rotation.

The portion 27a of the string 27 in FIG. 15 is positioned on the surface of the mirror proper 4 to wipe the surface and the portion 27b is taken up as wounded on the string take-up drum 35a.

In the embodiment shown in FIG. 15, the string 27 has fixed to the end of the wiping portion 27a thereof a joint ball 32c which is rotatably hooked to a joint bracket 32d fixed to the circumferentially moving belt 26.

Figure 17A:
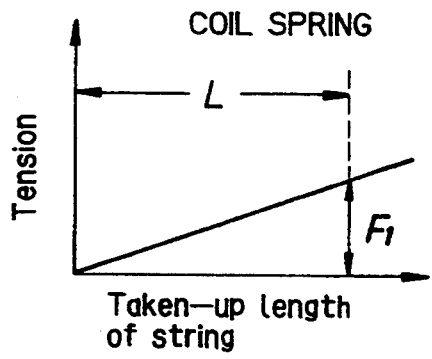
FIGS. 17(A) and 17(B) are graphs showing the relations between the taken-up length and tension of string when the elastic member is a coil spring and when it is a flat spiral spring, respectively.
Figure 17B:
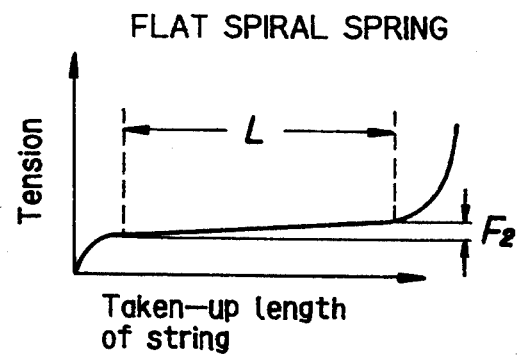

FIG. 17(A) shows the relation between taken-up length of string and string tension when the tension coil spring 28b is used as shown in FIG. 5. FIG. 17(B) shows the relation between taken-up length of string and string tension when the flat spiral spring 35d is used as shown in FIG. 15. As seen, in case the coil spring 28b is used, the string tension changes by F1 for the change L in taken-up length of string, and in case the flat spiral spring is used, the tension changes by F2. Since F1>F2, the flat spiral spring is superior to the coil spring in maintenance of a constant string tension.

Figure 18:
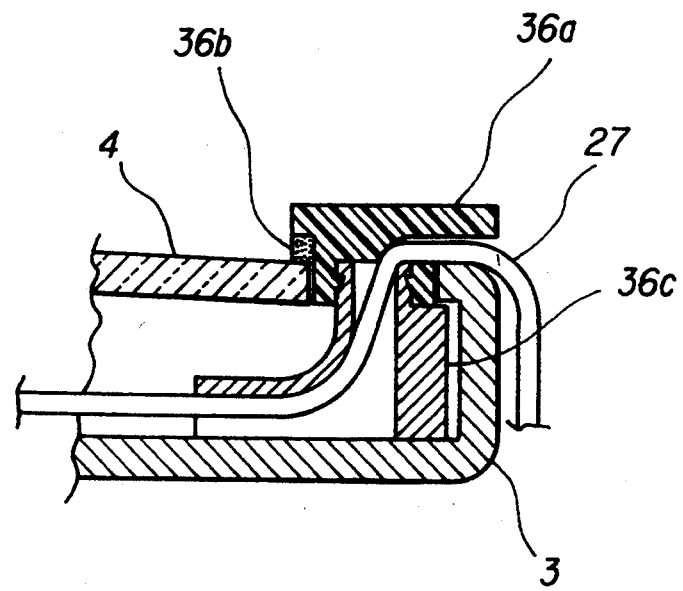
FIG. 18 is a sectional view of a further variant of the first embodiment in FIG. 5, showing the lead-out of the string from the mirror holder.
Figure 19:
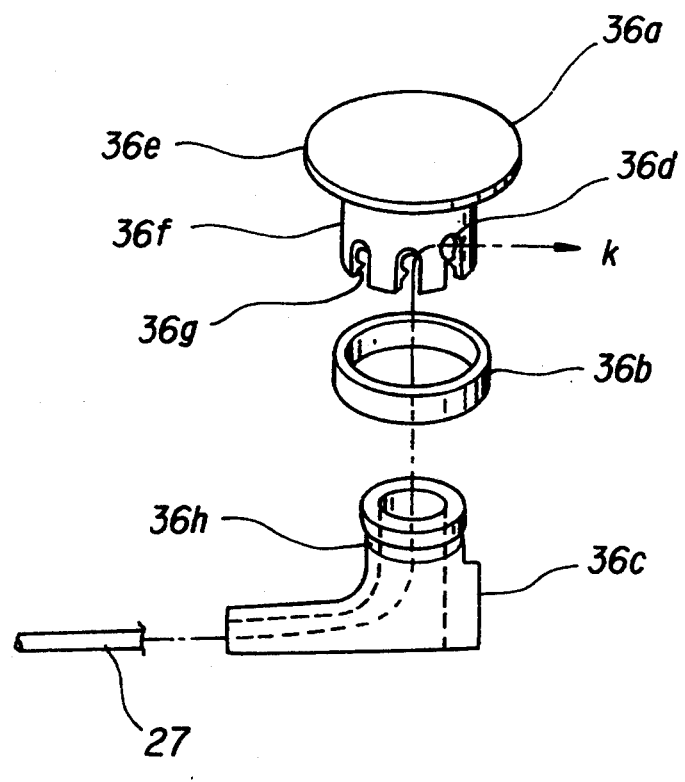
FIG. 19 is an exploded perspective view of the essential members in the variant in FIG. 18.

The first embodiment shown in FIG. 5 does not esthetically look well because the tensioner inlet 28c is visible from outside, and dust or waterdrop may possibly enter from near the tensioner inlet 28c into the mirror holder 3. FIGS. 18 and 19 show a variant of the first embodiment, improved in the respects of appearance and dust- and water-proofing structure. FIG. 18 is a sectional view of the lead-out of the string 27 from the mirror holder 3, and FIG. 19 is an exploded perspective view of a portion of the variant in FIG. 18.

There is fixed inside the mirror holder 3 a bush 36c in which a cover 36a is rotatably fitted. As shown in FIG. 19, the cover 36a comprises a flange 36e which overlies the lead-out hole for the string 27 and a cylindrical portion 36f which is fitted on the bush 36c. The cylindrical portion 36f has formed inside thereof pawls 36g which are to be rotatably engaged in an annular recess 36h formed in the bush 36c to prevent the disconnection between the cylindrical portion 36f and bush 36c. The reference numeral 36b denotes a cushion ring made of a sponge rubber. It is easily deformable. When pressed by the string 27, the cushion ring 36b is deformed, so it serves as a seal. The cover 36a has cuts 36d formed in the cylindrical portion 36f thereof as shown in FIG. 19. The string 27 is led out through any of the cuts 36d as indicated with an arrow k. The clearance between the cut 36d and string 27 is covered with the cushion ring 36b. Thus, no water or dust will possibly enter into the mirror holder 3. Since the portion where the string 27 is led out from the mirror holder 3 (indicated as the tensioner inlet 28c in FIG. 5), is not visible from outside, so there is nothing spoiling the appearance of the mirror when the wiper is out of wiping operation.

As having previously been described with reference to FIG. 5, when the circumferentially moving belt 26 rotates in the directions of arrows b and c, the end 27a (27a') of the string 27 is moved in the direction of arrow c. Thus, the string 27 deflects in the direction of arrow d to wipe the mirror surface. The angle of rotation of the circumferentially moving belt 26 has to be detected for the following two reasons:

(1) If the one end of the string 27' is at the position 27a' in FIG. 5 when the wiper is put out of wiping operation, the string 27' will stop and stay obliquely across the mirror surface as indicated with dot-dash line, thus spoiling the appearance of the mirror. Thus it is desirable that the one end (connection to the circumferentially moving belt 26) of the string 27 should be stopped at a position as near the tensioner inlet 28c as possible by controlling the rotation of the circumferentially moving belt 26. For this control, it is necessary to detect the angle of rotation of the circumferentially moving belt 26. If it is possible to detect the angle of rotation, the one end (for example, the end 27a) of the string 27 can be stopped at a desired position without any special difficulty by using a well-known control technique.

(2) When it rains heavily, the circumferentially moving belt 26 should be continuously rotated for continuous wiping by the string 27. In case of a light rain, however, such a continuous wiping is not necessary. It suffices to make a single or several wiping operations by the string 27, followed by a certain pause before a next wiping operation. That is, an intermittent wiping will do against a light rain. During driving in a rain, the windshield of a car, for example, will be applied with raindrops from the front. The reflecting surface of an outside mirror is orientated in an opposite direction to the running direction of the car, so an intermittent wiping at long intervals will do in a light rain. For such control of the wiping operation, the angle of rotation of the circumferentially moving belt 26 has to be detected.

A further variant of the first embodiment, including an improvement for detection of the angle of rotation of the circumferentially moving belt 26, will be described below with reference to FIGS. 20 to 23.

Figure 20:
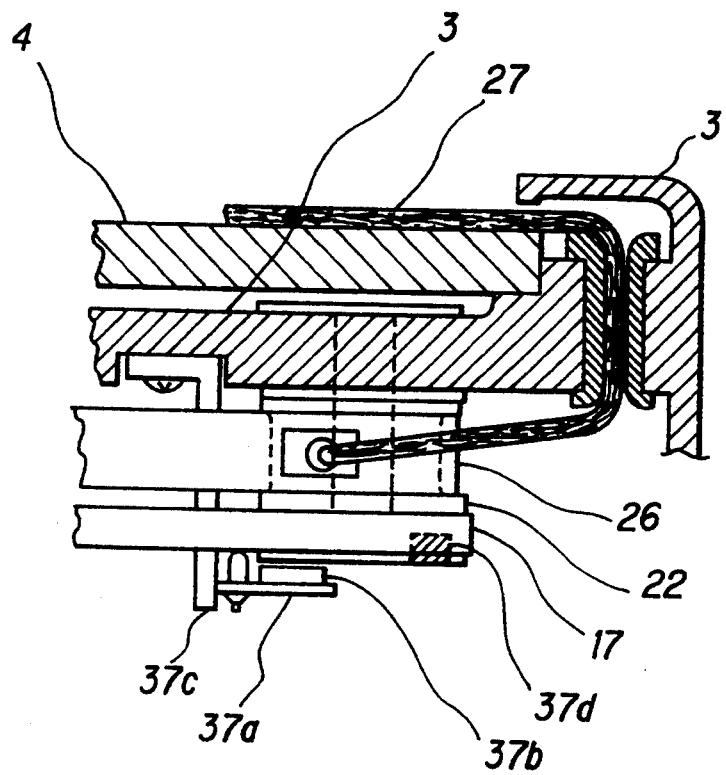
FIG. 20 is a sectional side elevation of the essential portion of a still further variant of the first embodiment in FIG. 5.
Figure 21:
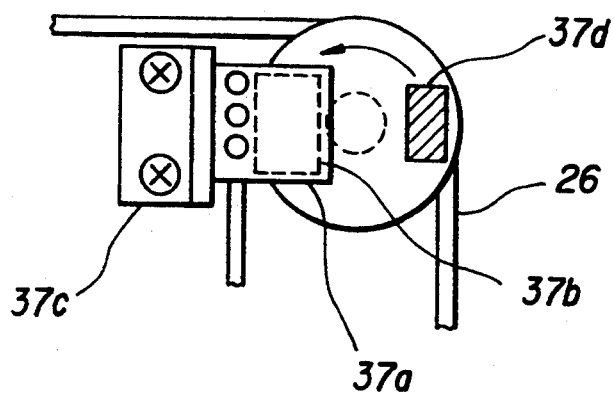
FIG. 21 is a bottom view of the essential portion of the variant in FIG. 20.

FIG. 20 is a sectional view of the variant, corresponding to FIG. 6, and FIG. 21 is a bottom view of the variant in FIG. 20. The variant is different from that shown in FIG. 6 in the following respects: Namely, this variant comprises a circuit board 37a having mounted thereon a Hall device 37b as a sensor, which is positioned opposite to and off the drive pulley 22. The Hall device 37b, or the circuit board 37a, is fixed to the mirror holder 3 by means of a bracket 37c. On the other hand, a magnet 37d as a target to be detected by the Hall device 37b is fixed to the pulley 22. When the magnet 37d comes near the Hall device 37b, it will be detected by the latter. The magnet 37d is fixed in a predetermined position on the bottom of the pulley 22 (so that the magnet 37d has a predetermined positional relation with the connection of the string 27 to the circumferentially moving belt 26). So it is detected when the magnet 37d has come near the Hall device 37b, the angle of rotation of the circumferentially moving belt 26 can be known to recognize where, the connection of the string 27 to the circumferentially moving belt 26 has come.

Figure 22:
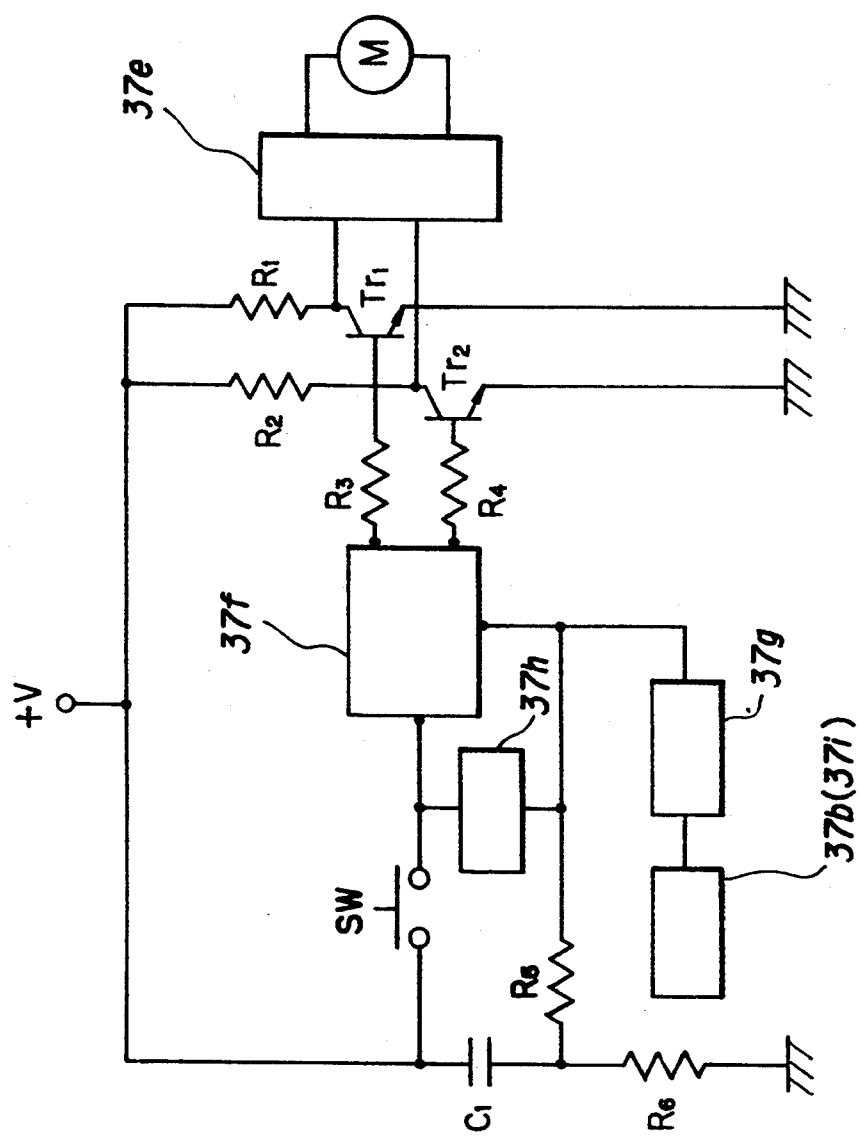
FIG. 22 is a circuit diagram intended for explanation of the electric circuit in which the Hall device in the variant in FIG. 20 is employed.

FIG. 22 is a schematic block diagram of an electric circuit including the Hall device 37b. The reference symbol M in Figure denotes a drive motor for the circumferentially moving belt 26. This motor M is started and stopped under the control of a motor driver IC 37e.

When the sensor (Hall device) 37b detects the target (magnet) 37d, a counter 37g counts the number of such detections. The signal from the counter 37g is passed through a flip-flop circuit 37f and transistors Tr1 and Tr2 to control the motor driver IC 37e, thereby opening and closing a power circuit for driving the motor M.

The reference numerals R1 and R2 denote voltage dropping fixed resistors, and R3 and R4 denote fixed resistors for controlling the base current of the transistors.

The reference numeral C1 denotes a resetting capacitor, and R5 and R6 denote resetting fixed resistors.

For stopping the mirror wiper after the circumferentially moving belt 26 is rotated N (N is a freely set positive integer) turns, for example, in a light rain, a switch SW is to be pressed momentarily. The motor M is put into operation and the number of detections by the sensor (Hall device) 37b is counted by the counter 37g. When the count reaches N, the motor M is stopped from running. Thereby, the string 27 wipes the mirror surface N times. After the wiping operation is over, the motor M is stopped while the one end 27a of the string 27 shown in FIG. 4 is positioned near the tensioner inlet 28c. Thus the string 27 is not visible from outside.

Figure 23:
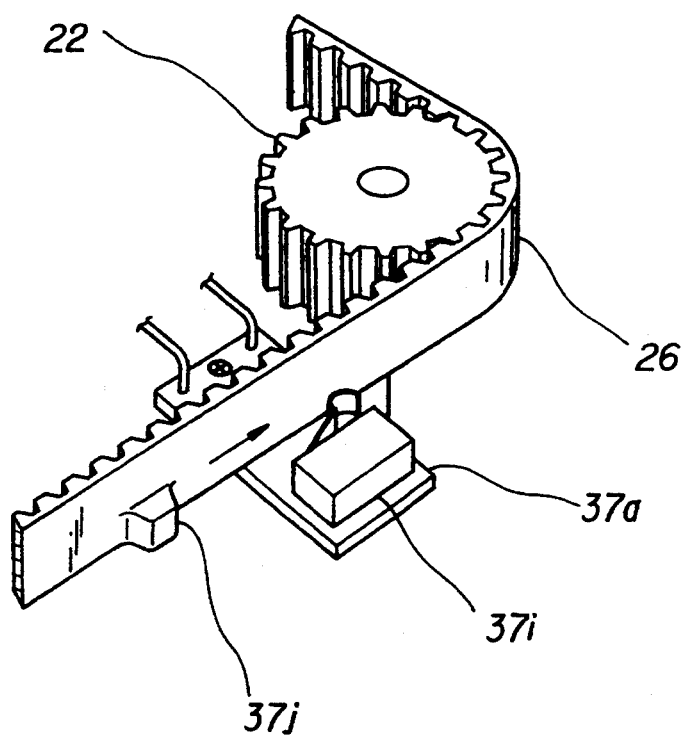
FIG. 23 is a perspective view of the essential portion of a still another variant which offers a similar effect to that in the variant in FIG. 20.

FIG. 23 shows a still further variant having a same effect as that of the variant shown in FIGS. 20 and 21. In this variant, a limit switch 37i is provided as sensor in place of the Hall device 37b and a projection 37j is used as detection target instead of the magnet 37d. When the projection 37j touches the limit switch 37i, the angle of rotation of the circumferentially moving belt 26 can be known. The electrical connection in this variant is almost same as that shown in FIG. 22. The Hall device is equivalent to the limit switch.

As having been described in the foregoing, the mirror wiper according to the present invention uses no such wiper arm and wiper blade, in the conventional mirror wipers, as have a relatively large inertia. Therefore, the mirror wiper according to the present invention generates little noise, and has almost no components visible from outside when not in operation so that the reflecting surface area of the mirror proper is not limited.

What is claimed is:

1. A wiper for an outside mirror for use on a vehicle, the outside mirror including a mirror housing tiltably supporting a mirror holder; and a mirror proper having a front reflective surface, a rear surface and a circumference, the mirror proper being fixed to the mirror holder, the wiper comprising:
   a plurality of pulleys disposed on the mirror holder and lying behind the mirror proper;
   a circumferentially movable endless belt threaded on the plurality of pulleys such that the reflecting surface is nearly fully visible by a vehicle driver; and
   a string for wiping the reflective surface, the string having a first end connected to the circumferentially movable endless belt and a second end; and
   a tensioner connected to the second end of the string wherein the tensioner imparts a tension to the string.

2. A mirror wiper according to claim 1, wherein at least one of the plurality of pulleys is a drive pulley, the drive pulley having wound thereon the circumferentially movable endless belt and a transmission belt for rotating the drive pulley.

3. A mirror wiper according to claim 1, wherein at least one of the plurality of pulleys is a drive pulley, the drive pulley having fixed thereto a gear which is driven by a motor.

4. A mirror wiper according to claim 1, further comprising:
   a pivot rotatably supported in the mirror holder and a means for transmitting a rotation of the pivot to at least one of the plurality of pulleys;
   a motor disposed inside the mirror holder, a drive shaft rotated by the motor and a transmission shaft which is axially slidable but not rotatable in relation to the drive shaft; and
   a universal joint connecting the transmission shaft and the pivot.

5. A mirror wiper according to claim 1, wherein the string is connected at the first end to the circumferentially movable endless belt by means of a rotatable joint member having at least two parts that are movable relative to each other.

6. A mirror wiper according to claim 1, wherein at least one of the plurality of pulleys is pivotally supported by a pulley holder, the pulley holder being forced by an elastic member toward the circumferentially movable endless belt by means of the elastic member.

7. A mirror wiper according to claim 1, wherein the tensioner comprises a string take-up drum supported rotatably on to the mirror holder and a flat spiral spring which imparts a rotation to the string take-up drum.

8. A mirror wiper according to claim 1, wherein the tensioner comprises a tubular member in which the second end of the string is positioned and a coil spring for pulling the second end of the string into the tubular member.

9. A mirror wiper according to claim 1, wherein the tensioner is disposed inside the mirror holder, a cover is provided at a hole formed in the mirror holder, and the string is led out of the mirror holder from the tensioner by passing through the hole formed in the mirror holder;
   the cover being formed with a cut through which the string is passed and the cover being rotatably installed to the mirror holder.

10. A mirror wiper according to claim 9, wherein the cover comprises a flange and a cylindrical portion fittable onto a bush fixed inside the mirror holder, the cylindrical portion having formed on an interior thereof pawls which are engaged in an annular recess in the bush to prevent disconnection between the cylindrical portion and the bush.

11. A mirror wiper according to claim 1, wherein at least one of the circumferentially movable endless belt and one of the plurality of pulleys has fixed thereto a target for detecting an angle of rotation of the circumferentially movable endless belt; and a sensor fixed to the mirror holder, for detecting the target.

12. A mirror wiper according to claim 11, wherein the target is a projection provided on the circumferentially movable endless belt and the sensor is a limit switch which is pushed by the projection.

13. A mirror wiper according to claim 11, wherein the target is an iron-made member and the sensor is a Hall device.

* * * * *